United States Patent Office 2,799,776
Patented July 16, 1957

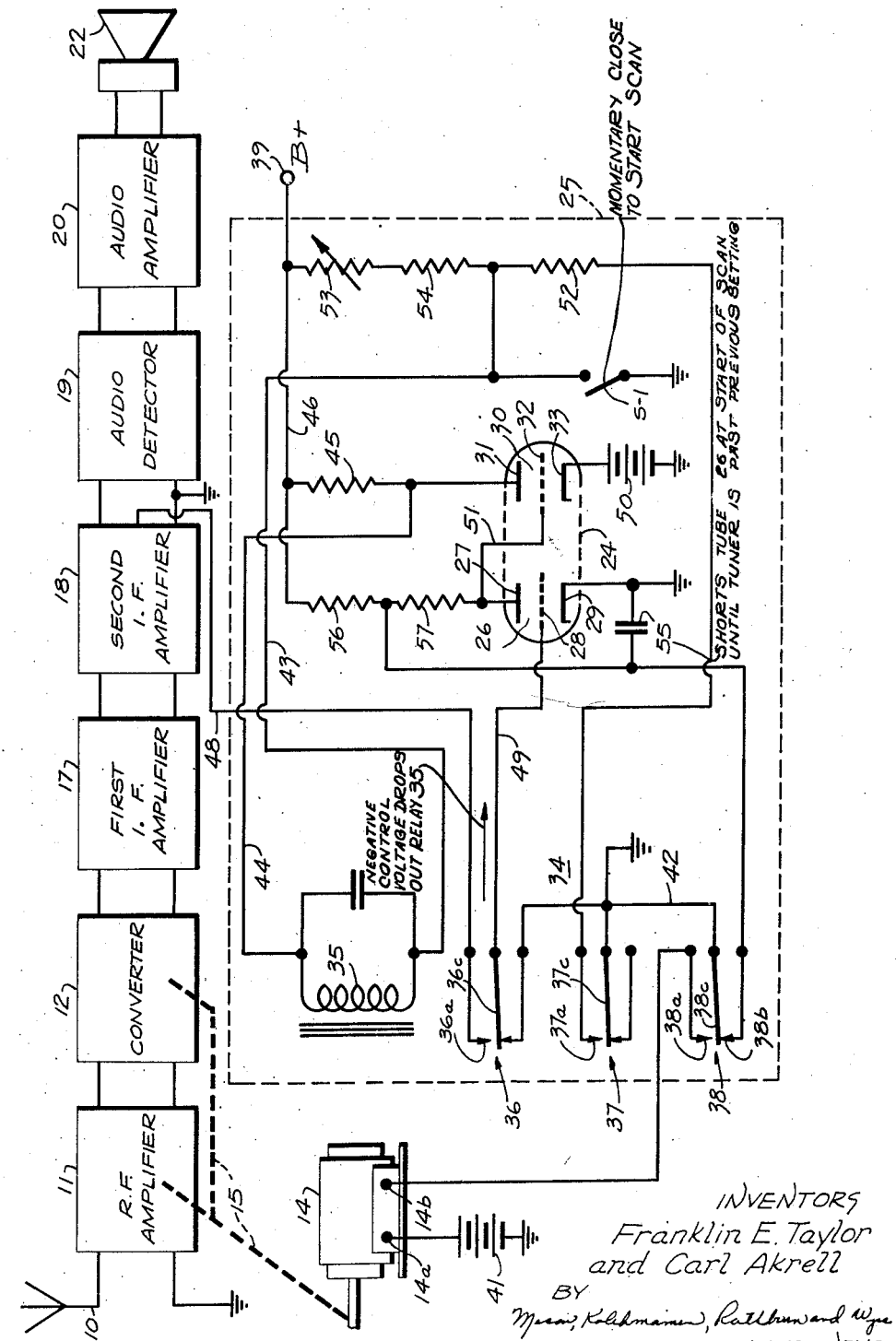

2,799,776

CONTROL CIRCUIT FOR SIGNAL SEEKING RECEIVER

Franklin E. Taylor, Buffalo, and Carl Akrell, Snyder, N. Y., assignors to Sylvania Electric Products Inc., a corporation of Massachusetts Application August 26, 1955, Serial No. 530,689

10 Claims. (Cl. 250—20)

The present invention relates to control circuits, more particularly to such circuits as may be employed to control a scanning relay in a signal seeking receiver, and the invention has for an object the provision of a new and improved control circuit for a signal seeking receiver which provides high accuracy of switching in response to a control voltage signal irrespective of fluctuations in the voltage level of the energizing source.

When signal seeking receivers are employed in automotive vehicles it is desirable, if not altogether necessary, that they be adapted to be energized from the battery used to energize the other electric equipment in the vehicle. As is well known in the art, the output voltage of such batteries varies over a wide range of values. For example, an automobile battery having a rated output of 6 volts may have an actual output voltage ranging anywhere between 5.5 and 8 volts. This variation in energizing voltage for the receiver may have an appreciable effect on the triggering signal which is derived from the circuits of the radio receiver to cut off the automatic band scanning operation when a signal of predetermined strength is tuned in and also affects the scanning control circuit of the receiver wherein accuracy of stopping in response to the triggering signal is required. In a co-pending application of Franklin E. Taylor, Serial No. 625,410, filed on November 30, 1956, which is assigned to the same assignee as the present invention, there is provided a polarized triggering signal which has a magnitude indicative of the condition of tuning of the receiver, this magnitude which is substantially independent of variations in the energizing voltage, has a relatively fixed value when the receiver is tuned a predetermined frequency distance away from the desired center frequency.

When the triggering signal impressed on the scanning control circuit reaches a predetermined value, it is most important that the scanning operation be terminated either immediately or a fixed time interval thereafter so that high accuracy of tuning is achieved, and consequently, the receiver is operated at its maximum efficiency to provide audio reproduction of high quality.

Therefore, another object of the present invention is to provide a new and improved control circuit which is responsive to an input signal of predetermined magnitude irrespective of wide variations in the energizing voltage provided for the control circuit.

A further object of the present invention is to provide a new and improved signal seeking receiver employing a switching control circuit for the scanning motor of the receiver which will cause deenergization of the motor at a fixed time after an intelligence voltage signal of at least a predetermined magnitude is impressed on the control circuit.

Briefly, the above objects are realized in accordance with the present invention by the provision of a bridge type control circuit wherein one leg of the bridge comprises a space current discharge device, the conductivity of which is controlled by a triggering signal, the voltage level of this signal being indicative of the condition of tuning of the radio receiver in which the control circuit is employed. A switching relay, which is adapted directly to control the energization of the scanning motor, is energized when a condition of unbalance occurs in the bridge and is deenergized to interrupt the operation of the scanning motor when the discharge device becomes heavily conductive to substantially balance the bridge. Therefore, when the receiver is properly tuned, the discharge device in the bridge becomes conductive, the bridge is substantially balanced, and the relay is dropped out to stop the scanning motor.

The invention, both as to its organization and method of operation, together with further objects and advantages thereof, will best be understood by reference to the following detailed description taken in connection with the accompanying drawing in which the single figure thereof is a schematic illustration of the control circuit of the present invention as incorporated in a signal seeking receiver.

Referring now to the drawing, an antenna 10 which is suitably adapted to receive signals of frequencies within a particular frequency band such as, for example, the broadcast band, has the output thereof coupled to a conventional R. F. amplifier 11, which includes one or more tuned circuits and selectively couples signals from the desired station within the broadcast band from the antenna 10 to a converter 12. The converter 12 conventionally includes a local oscillator having an adjustable output frequency which is mixed with the amplified R. F. signal from the R. F. amplifier 11 to provide the desired intermediate frequency signal which is coupled to the I. F. amplifiers 17 and 18. The tuned circuits of the R. F. amplifier 11 and of the oscillator section of the converter 12 are suitably ganged together and are connected to the output shaft of a single phase D. C. electric motor 14, such connection being schematically illustrated by the dotted lines 15. It will be understood that these adjustably tuned circuits in the R. F. amplifier 11 and the converter 12 may be of any suitable type, such, for example, as variable capacitors, inductors, or, if desired, a combination of the two.

The I. F. signal which is developed at the output of the second I. F. amplifier 18 is supplied to an audio detector 19 wherein the modulation components of the I. F. signal are detected, these modulation components being the audio signal. The audio signal which is thus derived from the I. F. signal by the audio detector 19 is amplified in the audio amplifier 20 and is utilized to drive a conventional loud speaker system 22.

The radio receiver thus far described is entirely conventional and, therefore, its mode of operation need not be described in detail herein. It will be understood that although an electric motor 14 is shown in the drawing as a means of adjusting the tuned circuits of the R. F. amplifier 11 and the converter 12, thereby to select a particular signal from the antenna 10, other suitable drive means may be employed for this purpose and, if desired, manual means may be additionally provided for making a tuning adjustment independently of the motor 14.

The control circuit of the present invention, which is shown in the area enclosed by the dotted lines 25, comprises a first triode discharge device 26 having an anode 27, a control electrode 28 and a cathode 29, and a second discharge device 30 having an anode 31, a control electrode 32 and a cathode 33. For purposes of economy and of minimizing the space required for housing the control circuit 25, both of the triode discharge devices 26 and 30 are conveniently enclosed within a single envelope 24. The tubes 26 and 30 preferably comprise a dual triode of the commercial type 12AU7. A scanning control switching relay 34 having a solenoid winding 35, a first contact section 36, a second contact section 37, and a third contact section 38 is adapted to be energized from the B+ terminal 39.

As shown in the drawing, the scanning motor 14 is provided with a pair of input terminals 14a and 14b and is adapted to be energized through the contact section 38 when the relay 34 is picked up by the energization of the winding 35. Specifically, a source of direct voltage 41, preferably the automobile battery, is connected between ground and the terminal 14a, the other terminal 14b of the motor being connected to a normally open contact 38a of the contact section 38. Since the common terminal 38c of the contact section 38 is connected to ground by means of the conductor 42 it may be seen that when the winding 35 is energized, the terminal 14b is connected to ground so as to connect the motor directly across the battery 41. For convenience, when the rated voltage of the battery 41 is 6 volts D. C., the motor 14 may be selected to be a simple, single phase 6 volt D. C. motor. Where, however, it is desired that the motor 14 be operated in either of two directions, a reversible D. C. motor may be provided, and a circuit for deriving voltages of opposite polarity from the automobile battery for selective connection thereto may be provided. Such a circuit arrangement is disclosed in the heretofore-mentioned copending application.

It can be seen from the description of the control circuit given thus far that when the relay winding 35 is deenergized, the motor 14 is effectively disconnected from the source of energization voltage appearing across the battery 41, and therefore, the tuning elements of the tuned circuits in the R. F. amplifier 11 and in the converter 12 remain stationary. The receiver thus remains tuned to a particular frequency in the broadcast band. When, however, the relay winding 35 is energized, the motor 14 is energized through the contact section 38 of relay 34 thereby continuously moving the tuning elements in the tuning sections of the R. F. amplifier 11 and the converter 12 to scan the frequencies of the desired band.

In order to commence the scanning operation by initially picking up the relay 34 so as to connect the normally open contact 38a to the common contact 38c, a scanning control switch S–1 is momentarily closed, thereby to connect the lower end of the winding 35 to ground through the conductor 43. Since the upper terminal of the winding 35 is connected to the B+ terminal 39 through the series connection of a conductor 44, a resistor 45, and a conductor 46, the winding 35 is connected across the B+ source and is supplied with enough current to pick up the relay 34 so as to close the normally open contacts in each of the contact sections 36, 37 and 38. When the normally open contact 36a is connected to the common contact 36c in the contact section 36, any signals appearing on the conductor 48 which is connected to the contact 36a are coupled through the contact section 36 and a conductor 49 to the control electrode 28 for inversion and amplification in the triode 26.

The conductor 48 is adapted to be supplied with a triggering signal having a voltage level indicative of the tuning condition of the tuned circuits in the R. F. amplifier 11 and the converter 12. The conductor 48 is illustrated in the drawing as being connected to the output terminal of the second I. F. amplifier from which the desired triggering signal is derived. Since the manner in which such a signal is developed in the receiver does not constitute a part of the present invention, such a circuit is not described in detail herein. However, there are many such circuits known in the prior art which develop a signal voltage of a predetermined magnitude in response to a particular tuning condition of the receiver. One such circuit, which is particularly insensitive to supply voltage variations, is disclosed in the heretofore-mentioned copending application.

The cathode 33 of the triode 30 is connected to ground through a source of D. C. voltage 50 having the positive terminal thereof connected to the cathode 33, thereby raising the potential of the cathode to a value dependent upon the voltage of the source 50. For proper operation of the control circuit of the present invention, this voltage should be approximately 15 volts so that when no signal is supplied to the control electrode 28, the voltage developed at the anode 27 of the tube 26 and connected over the conductor 51 to the grid 32 is sufficient to cause conduction of the tube 30. Consequently, when no signal appears on the conductor 48, the tube 30 is held beyond cutoff by the source 50 which is connected to the cathode 33. Although the battery 50 has been shown for providing the necessary positive D. C. voltage at the cathode 33, this voltage is preferably derived from some point in the receiver which operates at approximately such a voltage level. For example, where a push-pull audio output stage is utilized in the receiver, such a voltage may conveniently be derived from one of the cathode circuits thereof.

As is well known in the art, the current required to be supplied to the winding 35 in order initially to pick up the relay 34 is substantially greater than the current required to be supplied to the winding 35 to maintain the relay 34 in an energized condition. Therefore, in order to minimize current consumption, the current in the winding 35 is reduced after the relay has been energized by the addition of the resistor 52 in series connection therewith through the normally open contact 37a and the common contact 37c of the contact section 37, the common contact 37c being connected to ground. It will be seen, therefore, that once the switch S–1 has been closed for a sufficient time for the relay 34 to be picked up, opening of the switch S–1 does not cause the relay 34 to be dropped out since the winding 35 remains energized through the holding contacts 37a and 37c of the contact section 37. In consequence thereof, the switch S–1 is ordinarily provided with spring means (not shown) for biasing the switch to a normally open position so that each time it is desired to scan the broadcast band the switch S–1 may be momentarily depressed to initially energize the winding 35. The scanning mechanism thereafter operates automatically until the tuning sections of the R. F. amplifier 11 and the converter 12 are adjusted properly to select one of the received signals which is of at least a predetermined strength. When these tuning sections are so positioned, the relay 34 is dropped out and the scanning operation terminates.

The energization voltage impressed upon the B+ terminal 39 and which is derived from the automobile battery voltage, is subject to fluctuations throughout a wide range. Consequently, unless some means is provided for overcoming the effect of such changes on the holding current provided in the winding 35, the dropping out of the relay 34 will not only depend upon the magnitude of the signal voltage supplied to the electrode 28 but will also depend upon the magnitude of the energization voltage supplied to the terminal 39. As is evident to those familiar with signal seeking receiver operation, it is desirable that the magnitude of the intelligence signal appearing on the conductor 48 be the only variable for determining the time at which the relay 34 drops out so as to interrupt the scanning operation.

In order to render the drop-out point of the relay 34 independent of the voltage level of the source of energization connected to the B+ terminal 39, a pair of resistors 53 and 54 are serially connected between the terminal 39 and the conductor 43, and a resistor 52 is connected from the conductor 43 to ground through the contact section 37. It may thus be seen that a bridge circuit is provided which consists of a first leg comprising the resistor 45, a second leg comprising the series connection of the triode 30 and the battery 50, a third leg comprising the resistor 52, and a fourth leg comprising the serially connected resistors 53 and 54. The impedance values of each of the legs of the bridge are selected such that the bridge is substantially balanced when the triode 30 is highly conductive and unbalanced when the triode 30 is non-conductive. The relay winding 35 is connected across one diagonal of the bridge and, therefore, is deenergized when the bridge is balanced and is energized when the bridge is unbalanced.

In order to permit adjustment of the amount of current in the winding 35 when the triode 30 is cut off and the bridge is unbalanced, the resistance value of the resistor 53 is adjustable. Therefore, when a negative voltage of sufficient magnitude is provided on the electrode 28 to prevent conduction between the cathode 29 and the anode 27, the anode voltage of the triode 26 rises to a relatively high value, thereby to provide a relatively high positive voltage on the grid 32 and render the tube 30 highly conductive. When the triode 30 thus conducts, the impedance of the anode-to-cathode circuit thereof drops to a relatively low value, thereby balancing the bridge and greatly reducing the voltage across the winding 35. Therefore, when the triggering voltage on the control electrode 28 is sufficient to cut off the triode 26, the current in the winding 35 quickly drops to a low value, the relay 34 drops out, the motor 14 is disconnected from the energizing source 41, and the scanning operation is terminated.

Because the relay winding 35 is connected in the above described bridge circuit, both branches of which are connected to be energized from the voltage appearing at the B+ terminal 39, and since the change in current through the winding 35 is appreciable when the condition of conduction of the triode 30 is changed from non-conductive to conductive, the voltage appearing at the B+ terminal 39 can change over a relatively wide range without appreciably affecting the voltage appearing at the control electrode 28 which is necessary to drop out the relay 34. By a proper selection of the values of the parameters connected in the bridge circuit, such values for one embodiment being given hereinafter, the current in the winding 35 may change from a high positive value to a small negative value at the time the triode 30 changes from a non-conductive to a conductive condition. In a reduction to practice of the present invention, this reversal of polarity of the voltage across the relay winding 35 occurred when the triode 30 was initially rendered conductive with the B+ voltage being adjusted to various values throughout the entire range through which it may vary when derived from the voltage developed by an automobile battery.

In the signal seeking receiver of the present invention it is necessary that the scanning motor 14 be locked in an energized condition for a sufficient time after actuation of the switch S-1 irrespective of the signal supplied to the control electrode 28 so that when the switch S-1 is actuated while a signal of sufficient strength to stop the scanning operation is tuned in, the motor 14 will operate for a sufficient time to move the tuner setting away from this signal. Otherwise, unless the switch S-1 is manually held in a closed position for at least a predetermined period of time, the tuner will not move away from a strong signal. Therefore, to permit the tuned circuits in the RF amplifier 11 and converter 12 to be adjusted to tune the receiver to a frequency removed from a relatively strong signal to which the receiver was tuned when the switch S-1 was actuated, there is provided a time delay circuit comprising the capacitor 55 and the resistors 56 and 57, the latter resistors being serially connected between the anode 27 and the B+ terminal 39. This time delay circuit maintains the triode 30 in a non-conductive condition for a sufficient time to permit the motor 14 to de-tune the tuned circuits in the R. F. amplifier 11 and the converter 12 with respect to the signal which was previously tuned in.

Specifically, the capacitor 55 is connected between the junction of the resistors 56 and 57 to ground and the junction of the resistors 56 and 57 is also connected to the normally closed contact 38b of the contact section 38 of the relay 34. Assume, therefore, that the receiver is tuned to a signal of at least a strength sufficient to produce a satisfactory audio signal at the speaker 22, and therefore, an intelligence signal of a negative voltage sufficient to cut off the triode 26 under normal operating conditions is developed on the conductor 48. When the switch S-1 is actuated to commence the scanning operation by energizing the winding 35 to pick up the relay 34, the capacitor 55 which previously had both plates thereof connected to ground, is now connected in parallel with the triode 26 and its associated anode resistor 57, thus maintaining the triode 26 in a non-conductive condition until the capacitor 55 has been charged to at least a predetermined voltage.

As the capacitor 55 is charged and the voltage thereacross approaches that of the B+ supply which is connected to the terminal 39, the voltage drop across the resistor 56 due to the charging current therein diminishes. Therefore, in the absence of conduction in the triode 26, the potential at the control electrode 32 approaches that of the B+ terminal 39. However, prior to the time that the potential at the control electrode 32 becomes sufficiently positive to initiate conduction in the triode 30, the tuning elements in the R. F. amplifier 11 and the converter 12 have been so adjusted by the operation of the motor 14 that the intelligence signal supplied to the control electrode 28 becomes insufficient to maintain the triode 26 in a non-conductive state. Therefore, the triode 26 becomes conductive before current is initiated in the triode 30. It may thus be seen that when the scanning switch S-1 is momentarily actuated, the time delay circuit including the capacitor 55 and the resistor 56 prevents the potential at the control electrode 32 from rising to the B+ value and maintains the tube 30 in a non-conductive condition to insure that the relay 34 remains picked up for a sufficient time to permit the scan motor 14 to adjust the tuner away from the previously received signal.

It will be understood that in the absence of the time delay circuit the signal seeking receiver of the present invention is operative but the user is required to hold the scanning switch S-1 closed for a sufficient time to permit the receiver to be tuned from the previously received signal. Since it is desirable that the audio circuits be squelched during automatic tuning of the receiver, in the absence of the time delay circuit the user is required to guess as to the amount of time that the switch S-1 must be maintained closed. Therefore, where two stations are particularly close together, the second station might possibly be passed over altogether or the receiver might be incorrectly tuned to this signal if the switch S-1 is not opened at the proper time. In either event, the results are particularly undesirable.

By properly selecting the capacitance and resistance values of the capacitor 55 and the resistor 56, respectively, the control circuit of the present invention becomes operative in the normal manner shortly after the triggering signal supplied to the control electrode 28 becomes less than that required to cut off conduction in the triode 26. Therefore, as long as stations which occupy adjacent channels in the transmission band are sufficiently separated that the triggering signals therefrom do not overlap to the extent that such signals never fall below a value which permits conduction in the triode 26, the adjacent stations may be individually and accurately tuned in without any guesswork whatever on the part of the user, it being only necessary that he momentarily actuate the scan switch S-1.

Even if the signals do overlap, however, the time delay circuit insures that the new signal is tuned in, although the accuracy of tuning is not as great as where no overlapping occurs since with appreciable overlapping, it is the time delay circuit and not the triggering signal which determines the frequency at which the receiver is tuned.

It will be understood that various circuit arrangements and various circuit components may be employed in connection with the arrangement of the present invention. In order, however, to illustrate the relative magnitudes of the principal elements of a typical circuit arrangement which have been found satisfactory in one embodiment of the present invention, the following approximate values of such elements are given. It should be understood that these values are given by way of example only and not by way of limitation.

| | |
|---|---|
| Triodes 26 and 30 | 12AU7 |
| R45 ohms | 15,000 |
| R51 do | 15,000 |
| R53 do | 500 |
| R54 do | 4,700 |
| R56 do | 10,000,000 |
| R57 do | 5,000,000 |
| C55 microfarads | 0.1 |

While the invention has been described in connection with a particular embodiment thereof, it will be understood that those skilled in the art may make many changes and modifications. Therefore, in the appended claims, it is intended to cover all such changes and modifications as fall within the true spirit and scope of the invention.

What is claimed as new and desired to be secured by Letters Patent of the United States is:

1. A control circuit responsive to a control voltage signal to deenergize the coil of a switching relay, comprising, a first discharge device having an input and an output circuit, said device being responsive to an input signal to deenergize said coil, a second discharge device having an input circuit and an output circuit and adapted to supply a switching signal to the input of said first discharge device in response to said control voltage signal, and capacitor means adapted to be selectively connected across at least a portion of the output of said second discharge device only when said coil is energized.

2. A signal seeking receiver, comprising, motor means for controlling the tuning condition of said receiver, signal means for producing a polarized voltage signal indicative of the tuning condition of said receiver, bridge means responsive to said voltage signal for stopping the operation of said motor means, a manually controlled switch for operating said bridge means to energize said motor means to start the operation thereof, and time delay means operative upon the initial energization of said motor means to render said bridge means inoperative to stop said motor means for a predetermined time thereafter.

3. A signal seeking receiver, comprising, motor means for controlling the tuning condition of said receiver, signal means for producing a polarized voltage signal indicative of the tuning condition of said receiver, bridge means including a control tube responsive to said voltage signal for stopping the operation of said motor means, a manually controlled switch for operating said bridge means to energize said motor means to start the operation thereof independent of said control tube, and time delay means operative upon the initial energization of said motor means to render said bridge means inoperative to stop said motor means for a predetermined time thereafter.

4. In a signal seeking receiver, a control circuit of the type having a discharge device adapted to control the energization current in the solenoid of a switching relay, comprising, an amplifier responsive to a control voltage signal for determining the output current of said discharge device by means of the magnitude of a voltage appearing at an output of said amplifier, switch means for connecting a source of energizing current to said solenoid independent of said discharge device, and time delay means connected in the output circuit of said amplifier by said relay upon the energization of said solenoid, thereby to couple to said discharge device a voltage for maintaining said solenoid energized irrespective of said control voltage signal.

5. In a control circuit of the type having a discharge device adapted to control the energization current in the solenoid of a switching relay, the combination of an amplifier responsive to a control voltage signal for determining the output current of said discharge device by means of the magnitude of a voltage appearing at an output of said amplifier, switch means for connecting a source of energizing current to said solenoid independent of said discharge device, and time delay means including a capacitor which is adapted to be connected in the output circuit of said amplifier by said switching relay when said solenoid is energized, said time delay means being connected only in the output circuit of said discharge device, thereby to couple to said discharge device a voltage wave of predetermined duration for maintaining said solenoid energized for said predetermined duration irrespective of said control voltage signal.

6. In a control circuit of the type having a discharge device adapted to control the energization current in the solenoid of a switching relay, the combination of an amplifier responsive to a control voltage signal for providing an output voltage, said output voltage being connected to the input terminals of said discharge device for determining the output current of said discharge device, and time delay means, said time delay means including a capacitor and a resistor, said capacitor being connected directly across the output terminals of said amplifier by said relay only upon the energization of said solenoid, thereby to couple to said discharge device a signal for maintaining said solenoid energized irrespective of said control voltage signal.

7. In a signal seeking receiver, a circuit for controlling the energization of a control relay in response to a signal voltage supplied thereto, comprising, a bridge circuit having a first branch including a first impedance arm and a second impedance arm, a second branch including a third impedance arm and a fourth impedance arm, said branches being adapted to be energized from the same source of energization voltage, said fourth impedance arm including a discharge device having at least an anode, a cathode and a control electrode, means for developing a bias voltage between said control electrode and said cathode to render said discharge device normally non-conductive, means for energizing the winding of said relay from between the junction of said first and second and said third and fourth impedance arms to adjust the tuning condition of said receiver, and means for providing a trigger voltage indicative of the tuning condition of said receiver to overcome said bias voltage thereby to render said discharge device conductive when said signal voltage exceeds a predetermined magnitude and to interrupt adjustment of tuning.

8. In a signal seeking receiver, a circuit for controlling the energization of a tuning control relay in response to an intelligence signal voltage supplied thereto, comprising, a bridge circuit having a first branch including a first impedance arm and a second impedance arm, a second branch including a third impedance arm and a fourth impedance arm, said branches being adapted to be energized from the same source of energization voltage, said fourth impedance arm including a discharge device having at least an anode, a cathode and a control electrode, means for developing a bias voltage between said control electrode and said cathode to render said discharge device normally non-conductive, means for energizing the winding of said relay from between the junction of said first and second and said third and fourth impedance arms, means for providing an intelligence voltage to overcome said bias voltage when said receiver is tuned to a reproducible signal thereby to render said discharge device conductive when said intelligence voltage exceeds a predetermined magnitude, and a capacitor arranged to be connected between said anode and said cathode only when said winding is energized.

9. A control circuit for automatically operating a scanning motor of a signal seeking receiver which develops a polarized voltage signal having a magnitude indicative of the condition of turning of said receiver, comprising, means for amplifying and inverting said signal, bridge means having a condition of balance and a condition of unbalance, said bridge means being adapted to be energized from a source of polarized voltage, means for balancing said bridge means in response to the output of said first named means, relay means adapted to be energized when said bridge is unbalanced and deenergized when said bridge is balanced, and means for deenergizing said motor when said relay is deenergized whereby changes in the energizing voltage of said source do not appreciably affect the level of the voltage signal required to deenergize said relay.

10. A scan control circuit for a signal seeking receiver, comprising, motor means, first switch means responsive to the current in a portion thereof for controlling the energization of said motor means, bridge means having a condition of balance and a condition of unbalance, means for supplying current to said switch means only when said bridge is operated in a predetermined one of said conditions, second switch means connected in circuit with said first switch means and with a portion of said bridge for initially operating said first switch means irrespective of the condition of operation of said bridge, means for deriving from said receiver a signal indicative of the tuning condition thereof, and means for utilizing said signal for changing the operation of said bridge from said one of said conditions to the other of said conditions.

References Cited in the file of this patent
UNITED STATES PATENTS 2,468,350     Sunstein _____ Apr. 26, 1949